United States Patent [19]
Topham

[11] Patent Number: 5,407,016
[45] Date of Patent: Apr. 18, 1995

[54] PLOUGH

[76] Inventor: Peter D. T. Topham, Caldecote Manor Farm, Abbotsley, St. Neots, Cambs PE19 4XQ, United Kingdom

[21] Appl. No.: 39,399
[22] PCT Filed: Oct. 22, 1991
[86] PCT No.: PCT/GB91/01848
  § 371 Date: Apr. 16, 1993
  § 102(e) Date: Apr. 16, 1993
[87] PCT Pub. No.: WO92/06579
  PCT Pub. Date: Apr. 30, 1992

[30] Foreign Application Priority Data

Oct. 23, 1990 [GB] United Kingdom ............... 9023079
May 28, 1991 [GB] United Kingdom ............... 9111407
Sep. 4, 1991 [GB] United Kingdom ............... 9118870

[51] Int. Cl.⁶ ............................................. A01B 3/28
[52] U.S. Cl. ................................. 172/219; 172/228
[58] Field of Search ............... 172/219, 221, 228, 231

[56] References Cited

U.S. PATENT DOCUMENTS

| | | | |
|---|---|---|---|
| Re. 17,293 | 5/1929 | Shave | 172/219 |
| 301,313 | 7/1884 | Willis | 172/219 |
| 778,838 | 1/1905 | Belk | 172/219 X |
| 860,894 | 7/1907 | Belk | 172/219 X |
| 964,230 | 7/1910 | Gash | 172/219 |
| 4,216,730 | 8/1980 | Noble | 172/221 X |

FOREIGN PATENT DOCUMENTS

| | | | |
|---|---|---|---|
| 455691 | 8/1913 | France. | |
| 1412348 | 8/1965 | France. | |
| 509312 | 10/1930 | Germany | 172/219 |
| 645301 | 10/1950 | United Kingdom. | |
| 763033 | 12/1956 | United Kingdom. | |
| 2137461A | 10/1984 | United Kingdom. | |

Primary Examiner—Dave W. Arola
Assistant Examiner—Christopher J. Novosad
Attorney, Agent, or Firm—Harness, Dickey & Pierce

[57] ABSTRACT

A plough having a landslide and tilling mechanism, illustrated as a rotary disc or soil inversion wheel, which is pivotable in relation to the landslide between alternative positions providing for the left-hand or right-hand formation of a furrow, depending upon the direction of ploughing, when the plough is required to operate back and forth across a field.

7 Claims, 3 Drawing Sheets

PLOUGH

This invention relates to a plough. This invention also relates to a tractor when provided with the plough.

Many farms burn the residue of crops such as, for example, wheat straw in situ. The burning is a speedy way of getting rid of the residual part of the crops and the burning also effects a degree of weed and pest control. The burning of the crops is currently not favoured by many farms and local authorities and the alternative is to plough the residual part of the crops back into the land. The land on many farms is heavy which means that the land is difficult to plough. The land tends to stay lumpy and it is time consuming and expensive to plough the land down to a good tilth for enabling the seeding of fresh crops. Often discs are used to break up the soil but the use of such discs in wet conditions tends to pan the soil which stops water running through. The soil may tend to become like a mulch during heavy rain and then the land cannot be worked satisfactorily.

Given that some farms will prefer, or will be required by law, to plough in the residue of their crops, then it is desirable to ensure that the ploughing is effected as simply and as economically as possible. The known ploughs comprise a soil turning mechanism and a stabilising mechanism for keeping the plough in a straight line in a single direction during ploughing. During ploughing, the soil turning mechanism creates a sideways motion when turning over the soil, and this sideways motion is counteracted and balanced by the stabilising mechanism.

One known and presently well used stabilising mechanism is that known as a landslide. The known landslide is generally a flat piece of metal which slides in a single direction along the inside edge of a ploughed open furrow. As the landslide slides along the inside edge of the ploughed furrow, the landslide is subjected to wear and abrasion on one side only. The soil turning mechanism, for example a mouldboard, an inversion wheel or a disc, keeps the same position relative to the position of the landslide. Basically the landslide is rigidly fixed in position with respect to the soil turning mechanism, although in some cases there may be some adjustment available on the landslide for counteracting wear or aiding the forward movement of the plough. At the end of a line of ploughing, it is necessary to reverse the plough in order to plough a new line in the reverse direction. The reversing of the soil turning mechanism is often effected by an up and over movement which ensures that one half of the available soil turning mechanism and landslide operate when ploughing one way, and the other half of the available soil turning mechanism and landslide operate when ploughing the other way. The practice of reversing the soil turning mechanism with an up and over movement and using many landslides is complicated, time consuming and expensive. Also, the plough has twice the number necessary of soil turning mechanisms and stabilising systems as it might otherwise have since only one half is used at a time, with the other half being in transit.

It is an aim of the present invention to obviate or reduce the abovementioned problem.

According to the present invention, there is provided a plough comprising a soil tilling means and stabilising means for maintaining direction of movement of the plough during ploughing, said stabilising means comprising a fixed landslide and said soil tilling means being pivotally movable between first and second positions, relative to the landslide such that in the first position, the tilling means is operative to displace soil in one direction away from the direction of extent of the landslide and in the second position is operative to displace soil in the opposite direction away from the direction of extent of the landslide. Preferably, the soil tilling means comprises a rotatable tilling member which is supported for rotation by an arm which itself is pivotable about an upwardly extending axis for swinging movement between said first and second positions.

The arm may be a vertical or a semi-vertical arm. Suitably the lower end of the arm may be pivotally connected to the landslide. The soil tilling mechanism may be otherwise mounted if desired.

Preferably, a forwardly extending pointed member is provided forwardly of the tilling means to initiate breaking and turning of the soil. The pointed member may be mounted on a vertically positioned leg member of a plough frame.

The soil tilling or turning mechanism may be attached to the vertically positioned leg member. The soil turning mechanism may alternatively be attached to a body part of the plough or to any other suitable and appropriate part of the plough.

As indicated above, the plough of the present invention maybe arranged to be drawn behind a tractor or may be directly mounted to the tractor.

The invention will now be further described, by way of example, with reference to the accompanying drawings, in which:

FIG. 1 shows a known plough having a mouldboard type soil turning mechanism with each mouldboard being provided with a landslide stabilising means;

FIG. 2 is a diagrammatic perspective view from the rear and one side of part of a plough in accordance with the invention;

Figures 1, 2:
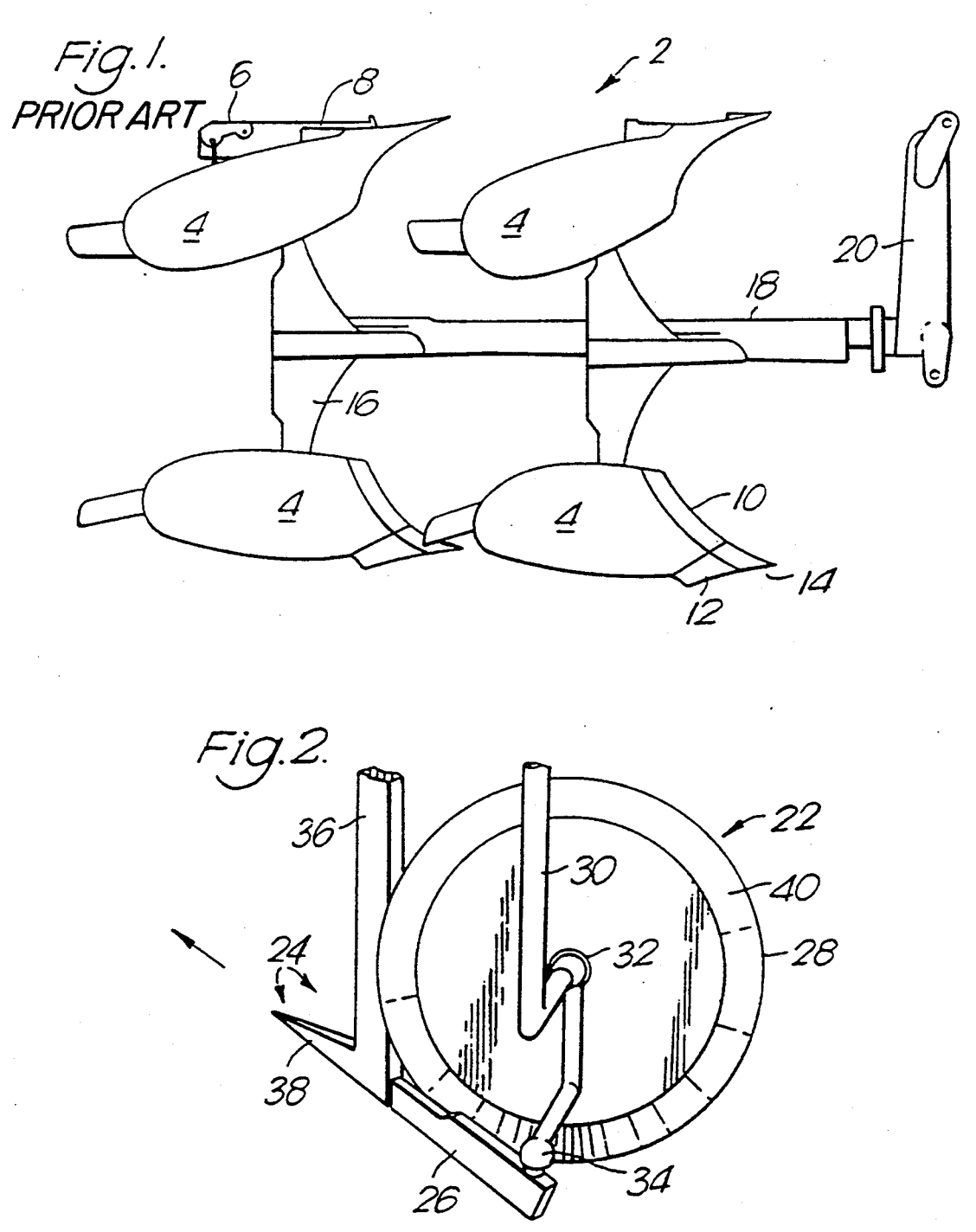
Figure 3:
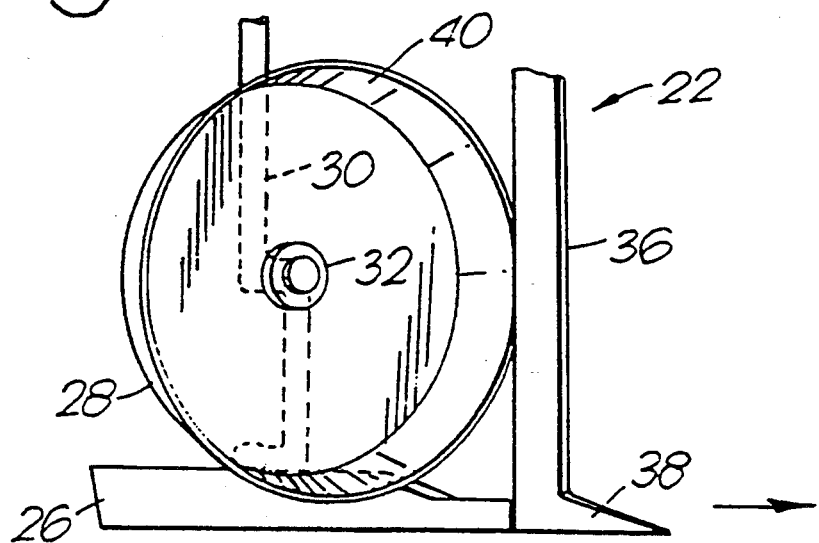
FIG. 3 is a view from the front and the other side of the part of the plough shown in FIG. 2.

Referring to FIG. 1, there is shown a plough 2 comprising a soil turning mechanism in the form of four mouldboards 4. The plough 2 also has a stabilising mechanism in the form of a single landslide 6 provided on each mouldboard 4, although, for purposes of convenience, only one landslide is shown in FIG. 1. The landslides 6 are attached to respective mouldboards 4 by frogs 8.

Each mouldboard 4 comprises a shin part 10, a wing part 12 and a point 14. Each mouldboard 4 is attached by a leg member 16 to a central body portion 18 of the plough 2. The body portion 18 is connected to an upright member 20 as shown.

As shown in FIG. 1, the bottom two mouldboards 4 are in a ploughing position for ploughing one way along a line of ploughing. At the end of the line of ploughing, the position of the mouldboards 4 is reversed so that the top two mouldboards 4 shown in FIG. 1 are then underneath and are available for ploughing a next subsequent line of ploughing in the reverse direction. It will thus be apparent that at any one time 50% of the available soil turning mechanism and stabilising mechanism in the plough 2 are not being used. It will also be apparent that the apparatus needed to reverse the position of the mouldboards 4 with an up and over action is complicated, time consuming and expensive.

Figure 4:
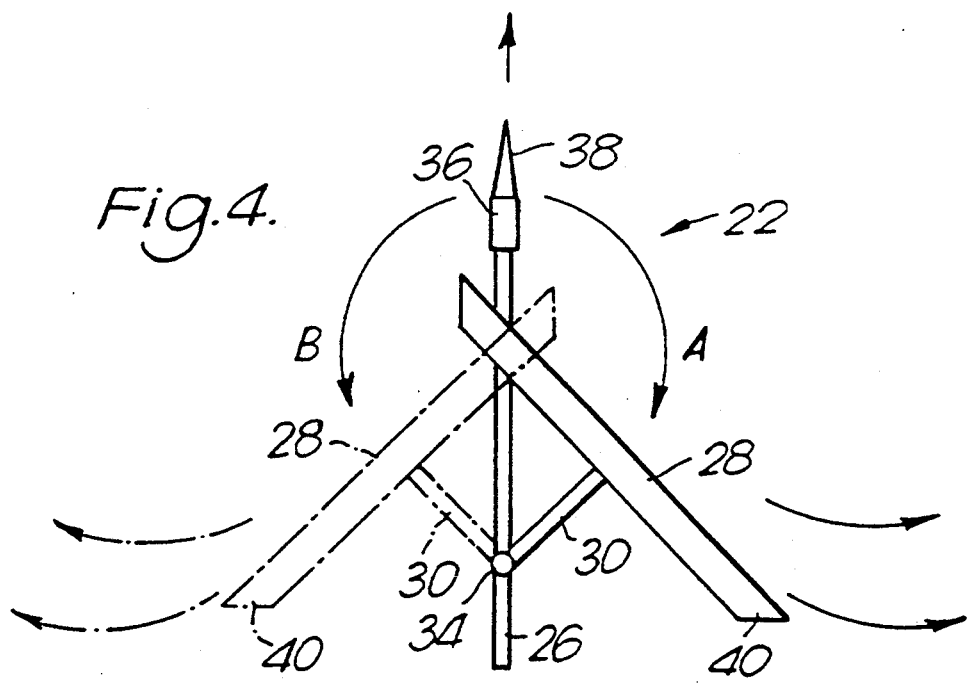
FIG. 4 is a top plan view of the apparatus shown in FIG. 3 and illustrates the reversing action of the plough.

Referring now to FIGS. 2, 3 and 4, there is shown a plough 22 comprising a soil turning mechanism 24 and a stabilising mechanism in the form of a landslide 26. The landslide 26 is for keeping the plough 22 in a straight line during ploughing, regardless of whether the former is being produced on the right-hand or left-hand side of the plough. As can be seen from FIGS. 2, 3 and 4, the landslide 26 extends in the direction of ploughing. The landslide 26 is fixed in position at the lower end of a vertical leg 36. During the process of ploughing, the landslide uses the side of the open furrow to create stability. The landslide gives stability in both directions of ploughing, with one side of the landslide operating when ploughing with a right-hand furrow and the other side of the landslide operating when ploughing with a left-hand furrow.

The soil turning mechanism 24 includes a tilling member disc 28 which is rotatably mounted about a vertically positioned pivotable cranked arm 30. As shown, the disc 28 is in the form of a soil inversion wheel having a central substantially planar portion provided with a frusto-conical rim 40. More specifically, the disc 28 rotates about a central axis 32 which extends above the landslide 26. The arm 30 pivots about a pivot axis 34. It will thus be appreciated that the arm 30 is pivotable and thus the disc 28 itself is pivotable to swing from the position A to the position B shown in FIG. 4. In the position A the disc 28 extends to one side of a vertically positioned leg member 6 and the landslide 26. In the position B, the disc 28 extends to the other side of the leg member 36 and the landslide 26.

The leg member 36 is provided with a forwardly extending point member 38 which is the first part of the plough to engage the soil during ploughing. The point member 38 forms part of the soil turning mechanism and helps to complement the action of the disc 28.

As can be appreciated from FIGS. 2, 3 and 4, it is quite easy to pivot the disc 28 between its two positions for ploughing up and down a field because of the use of the landslide 26. The arm 30 simply needs to be rotated about pivot axis 34. The arm 30 can be rotated by any suitable and appropriate mechanism (not shown).

Figure 5:
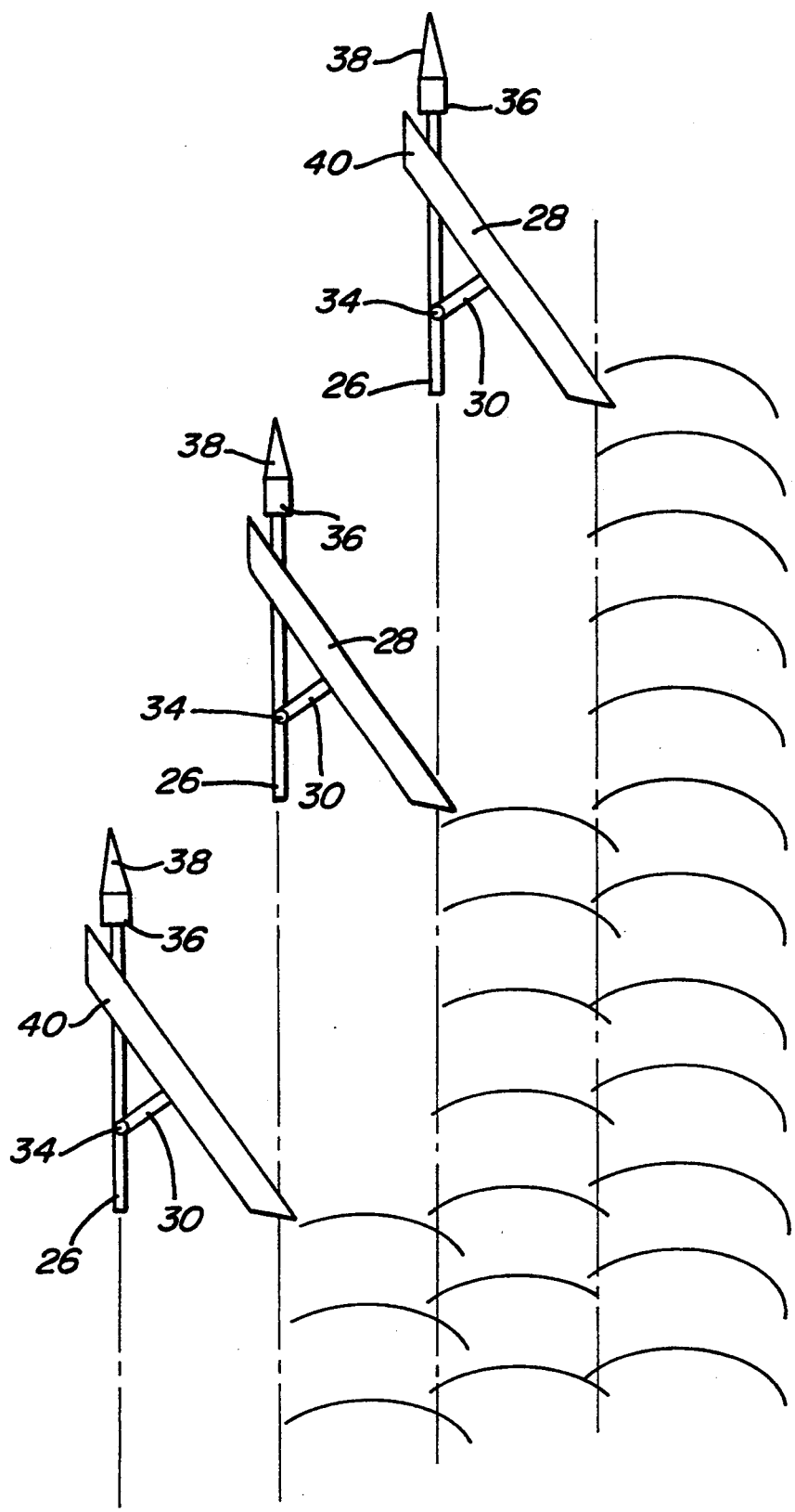
FIG. 5 is a diagrammatic top plan view similar to that of FIG. 4, but illustrating a plurality of soil tilling means, each provided with a landslide.

As will be appreciated, only part of the plough is shown in each of FIGS. 2 and 3. Thus, the plough will also comprise at least one frame member connected to the upper end of the leg member 36 with support being provided for the upper end of the cranked arm 30. This frame member can itself be attached to, or connected to be drawn from, a tractor. Normally, a plurality of ploughing apparatus as shown in FIG. 2 will be provided with the upper frame of each being connected to a beam extending diagonally with respect to the direction of movement of the plough during use thereof so that the individual ploughs will be in staggered formation with the earth turned from a succeeding plough being inverted into the furrow left by the immediately preceding plough as illustrated in FIG. 5. When reversing the direction of ploughing, the direction of inclination of the beam will then be changed so as to be oppositely inclined with respect to the direction of movement so as to change the direction of stagger as well as pivoting the individual discs 28 from one to the other of the positions A and B shown in FIG. 4.

It is to be appreciated that the embodiment of the invention described above with reference to the accompanying drawings has been given by way of example only and that modifications may be effected. Thus, for example, soil inversion wheel 28 can be replaced by another soil turning mechanism such as, for example, a conventional concave plough disc. Furthermore, the plough 22 may be such that one or more of the discs 28 or other soil turning mechanisms are used in a staggered formation. Still further, the shape of the arm 30 and the shape of the landslide 26 may be different to those shown. Also, more than one landslide may be used, for example where there is more than one soil turning mechanism. Thus, if desired, there may be one landslide for each individual soil turning mechanism that is employed.

During use, the landslide 26 may become worn, although wear will usually be equal on both sides since one side of the landslide operates when ploughing one way and the other side of the landslide operates when ploughing the other way. In order to counteract for wear, the landslide 26 may be provided with wear plates (not shown). Alternatively, the landslide 26 can simply be replaced when it is worn out.

I claim:

1. A plough comprising a stabilising means, for maintaining direction of movement of the plough relative to a ploughing direction during ploughing, a soil tilling means which comprises a rotatable tilling member and which is pivotally movable relative to the stabilising means between first and second positions on opposite sides of the ploughing direction such that in the first position the tilling means is operative to displace soil in one direction away from the ploughing direction and in the second position is operative to displace soil in a direction opposite to said one direction and away from the ploughing direction, and a pointed member fixed relative to the stabilising means and provided forwardly of the tilling member in a ploughing direction, the stabilising means comprising a fixed landslide for maintaining the position of the plough during ploughing by engaging the side of a furrow formed by the pointed member and the rotatable tilling member regardless of the direction of ploughing.

2. A plough according to claim 1, wherein the rotatable tilling member of the plough is one of the group consisting of a plough disc and soil inversion wheel.

3. A plough according to claim 1, wherein the tilling member is rotatably supported by an arm which is pivotable about an upwardly extending axis for swinging movement between said first and second positions.

4. A plough according to claim 3, wherein one end of the arm is pivotally supported by the landslide.

5. A plough according to claim 4, wherein the arm is a cranked arm.

6. A plough according to claim 1, further comprising a downwardly extending leg supporting the landslide.

7. A plough according to claim 1, wherein a plurality of said soil tilling means are provided, with a landslide being associated with each said soil tilling means.

* * * * *